United States Patent [19]
Nakajima et al.

[11] Patent Number: 5,450,582
[45] Date of Patent: Sep. 12, 1995

[54] NETWORK SYSTEM WITH A PLURALITY OF NODES FOR ADMINISTRATING COMMUNICATIONS TERMINALS

[75] Inventors: Ken Nakajima, Tokyo; Mitsuo Suzuki, Chigasaki, both of Japan

[73] Assignee: Matsushita Graphic Communication Systems, Inc., Tokyo, Japan

[21] Appl. No.: 375,139

[22] Filed: Jan. 19, 1995

Related U.S. Application Data

[63] Continuation of Ser. No. 878,699, May 5, 1992, abandoned.

[30] Foreign Application Priority Data

| May 15, 1991 | [JP] | Japan | 3-109990 |
| Mar. 6, 1992 | [JP] | Japan | 4-049251 |
| Mar. 6, 1992 | [JP] | Japan | 4-049252 |
| Mar. 6, 1992 | [JP] | Japan | 4-049253 |
| Mar. 6, 1992 | [JP] | Japan | 4-049254 |

[51] Int. Cl.⁶ .................. G06F 13/00; G06F 15/16; H04L 12/46
[52] U.S. Cl. .................. 395/600; 395/725; 395/400; 395/425; 370/60; 370/85.13
[58] Field of Search ........... 395/600, 725, 400, 425; 370/60, 85.13

[56] References Cited

U.S. PATENT DOCUMENTS

| 3,781,815 | 12/1973 | Boudreau et al. | 395/200 |
| 4,630,196 | 12/1986 | Bednar, Jr. et al. | 395/200 |
| 4,885,742 | 12/1989 | Yano | 370/85.2 |
| 5,005,122 | 4/1991 | Griffin et al. | 364/200 |
| 5,039,980 | 8/1991 | Aggers et al. | 340/506 |
| 5,117,430 | 5/1992 | Berglund | 370/85.1 |
| 5,155,847 | 10/1992 | Kirouac et al. | 395/600 |
| 5,216,591 | 6/1993 | Nemirovski et al. | 364/401 |
| 5,218,603 | 6/1993 | Watanabe | 370/85.13 |
| 5,265,235 | 11/1993 | Sindhu et al. | 375/725 |
| 5,291,490 | 3/1994 | Conti et al. | 370/85.4 |
| 5,297,137 | 3/1994 | Ofek et al. | 370/60 |
| 5,337,309 | 8/1994 | Faulk, Jr. | 370/60 |

FOREIGN PATENT DOCUMENTS

1166643  6/1989  Japan .

Primary Examiner—Thomas G. Black
Assistant Examiner—Jean R. Homere
Attorney, Agent, or Firm—Lowe, Price, LeBlanc & Becker

[57] ABSTRACT

The present invention relates to a network system capable of easily correcting communication terminal administration data identically in a plurality of nodes (i.e. store and forward machines) without specially requiring installation of any additional hardware. The network system comprises at least two nodes each administrating a plurality of communication terminals. Each of the nodes has a memory device memorizing not only data of its own administrating communication terminals but data of other communication terminals administrated by other nodes. And further, each node is effected to notify any change occurring in its own administrating communication terminals to other nodes in the network system.

17 Claims, 24 Drawing Sheets

FIG. 3

| NODE NUMBER | COMMUNICATION TERMINAL NO. | NETWORK ADDRESS | TERMINAL INFORMATION | OLD NETWORK ADDRESS | OLD TERMINAL INFORMATION |
|---|---|---|---|---|---|
| 1 | 1 | 034919191 | TOKYO HEAD OFFICE | | |
| | 2 | 034950631 | YOKOHAMA PLANT | | |
| | | | | | |
| 2 | 1 | 0529712822 | OSAKA BRANCH | | |
| | 2 | 064542651 | OSAKA 1ST PLANT | | |
| | 3 | 064542685 | OSAKA 2ND PLANT | | |
| | 4 | 069081480 | KOBE BRANCH | | |
| | 5 | 0526811780 | KOBE 1ST PLANT | | |
| | | | | | |
| N | 1 | 0922813838 | FUKUOKA BRANCH | | |
| | 2 | 0878211377 | NAGASAKI BRANCH | | |
| | | | | | |

FIG. 6

| NODE NUMBER | COMMUNICATION TERMINAL NO. | NETWORK ADDRESS | TERMINAL INFORMATION | OLD NETWORK ADDRESS | OLD TERMINAL INFORMATION |
|---|---|---|---|---|---|
| 1 | 1 | 034919191 | TOKYO HEAD OFFICE | | |
| | 2 | 034950631 | YOKOHAMA PLANT | | |
| | | | | | |
| 2 | 1 | 0529712822 | OSAKA BRANCH | | |
| | 2 | 064542651 | OSAKA 1ST PLANT | | |
| | 3 | 064542685 | OSAKA 2ND PLANT | | |
| | 4 | 069081480 | KOBE BRANCH | | |
| | 5 | 0526811780 | KOBE 1ST PLANT | | |
| | 6 | 0783324420 | KOBE 2ND PLANT | | |
| | | | | | |
| N | 1 | 0922813838 | FUKUOKA BRANCH | | |
| | 2 | 0878211377 | NAGASAKI BRANCH | | |
| | | | | | |

FIG. 7

| NODE NUMBER | NETWORK ADDRESS |
|---|---|
| 1 | |
| 2 | |
| | |
| N | |

FIG. 8

| NODE NUMBER | COMMUNICATION TERMINAL NO. | NETWORK ADDRESS | TERMINAL INFORMATION | OLD NETWORK ADDRESS | OLD TERMINAL INFORMATION |
|---|---|---|---|---|---|
| 1 | 1 | 034919191 | TOKYO HEAD OFFICE | | |
| | 2 | 034950631 | YOKOHAMA PLANT | | |
| | | | | | |
| 2 | 1 | 0529712822 | OSAKA BRANCH | | |
| | 2 | 064542651 | OSAKA 1ST PLANT | | |
| | 4 | 069081480 | KOBE BRANCH | | |
| | 5 | 0526811780 | KOBE 1ST PLANT | | |
| | | | | | |
| N | 1 | 0922813838 | FUKUOKA BRANCH | | |
| | 2 | 0878211377 | NAGASAKI BRANCH | | |
| | | | | | |

FIG. 9

| NODE NUMBER | COMMUNICATION TERMINAL NO. | NETWORK ADDRESS | TERMINAL INFORMATION | OLD NETWORK ADDRESS | OLD TERMINAL INFORMATION |
|---|---|---|---|---|---|
| 1 | 1 | 034919191 | TOKYO HEAD OFFICE | | |
| | 2 | 034950631 | YOKOHAMA PLANT | | |
| | | | | | |
| 2 | 1 | 0529712822 | OSAKA BRANCH | | |
| | 2 | 067727160 | KYOTO BRANNCH | 064542651 | OSAKA 1ST PLANT |
| | 3 | 064542685 | OSAKA 2ND PLANT | | |
| | 4 | 069081480 | KOBE BRANCH | | |
| | 5 | 0526811780 | KOBE 1ST PLANT | | |
| | | | | | |
| N | 1 | 0922813838 | FUKUOKA BRANCH | | |
| | 2 | 0878211377 | NAGASAKI BRANCH | | |
| | | | | | |

FIG. 17

| NODE NUMBER | COMMUNICATION TERMINAL NO. | NETWORK ADDRESS | TERMINAL INFORMATION | OLD NETWORK ADDRESS | OLD TERMINAL INFORMATION |
|---|---|---|---|---|---|
| 1 | 1 | 034919191 | TOKYO HEAD OFFICE | | |
| | 2 | 034950631 | YOKOHAMA PLANT | 034950633 | YOKOHAMA BRANCH |
| | | | | | |
| 2 | 1 | 0529712822 | OSAKA BRANCH | | |
| | 2 | 064542651 | OSAKA 1ST PLANT | | |
| | 3 | 064542685 | OSAKA 2ND PLANT | | |
| | 4 | 069081480 | KOBE BRANCH | | |
| | 5 | 0526811780 | KOBE 1ST PLANT | | |
| | 6 | 0783324420 | KOBE 2ND PLANT | | |
| | | | | | |
| N | 1 | 0922813838 | FUKUOKA BRANCH | | |
| | 2 | 0878211377 | NAGASAKI BRANCH | | |
| | | | | | |

FIG. 18

| NODE NUMBER | COMMUNICATION TERMINAL NO. | NETWORK ADDRESS | TERMINAL INFORMATION | OLD NETWORK ADDRESS | OLD TERMINAL INFORMATION |
|---|---|---|---|---|---|
| 1 | 1 | 034919125 | TOKYO 1ST PLANT | 034919191 | TOKYO H. OFFICE |
|   | 2 | 034950631 | YOKOHAMA PLANT | 034950633 | YOKOHAMA BRANCH |
|   |   |   |   |   |   |
| 2 | 1 | 0529712822 | OSAKA BRANCH |   |   |
|   | 2 | 064542651 | OSAKA 1ST PLANT |   |   |
|   | 3 | 064542685 | OSAKA 2ND PLANT |   |   |
|   | 4 | 069081480 | KOBE BRANCH |   |   |
|   | 5 | 0526811780 | KOBE 1ST PLANT |   |   |
|   | 6 | 0783324420 | KOBE 2ND PLANT |   |   |
|   |   |   |   |   |   |
| N | 1 | 0922813838 | FUKUOKA BRANCH |   |   |
|   | 2 | 0878211377 | NAGASAKI BRANCH |   |   |
|   |   |   |   |   |   |

FIG. 19

| NODE NUMBER | COMMUNICATION TERMINAL NO. | NETWORK ADDRESS | TERMINAL INFORMATION | OLD NETWORK ADDRESS | OLD TERMINAL INFORMATION |
|---|---|---|---|---|---|
| 1 | 1 | 034919191 | TOKYO HEAD OFFICE | 034919191 | TOKYO H. OFFICE |
|   | 2 | 034950631 | YOKOHAMA PLANT | 034950633 | YOKOHAMA BRANCH |
|   |   |   |   |   |   |
| 2 | 1 | 0529712822 | OSAKA BRANCH |   |   |
|   | 2 | 064542651 | OSAKA 1ST PLANT |   |   |
|   | 3 | 064542685 | OSAKA 2ND PLANT |   |   |
|   | 4 | 069081480 | KOBE BRANCH |   |   |
|   | 5 | 0526811780 | KOBE 1ST PLANT |   |   |
|   | 6 | 0783324420 | KOBE 2ND PLANT |   |   |
|   |   |   |   |   |   |
| N | 1 | 0922813838 | FUKUOKA BRANCH |   |   |
|   | 2 | 0878211377 | NAGASAKI BRANCH |   |   |
|   |   |   |   |   |   |

FIG. 20

| NODE NUMBER | COMMUNICATION TERMINAL NO. | NETWORK ADDRESS | TERMINAL INFORMATION | OLD NETWORK ADDRESS | OLD TERMINAL INFORMATION |
|---|---|---|---|---|---|
| 1 | 1 | 034919191 | TOKYO HEAD OFFICE | | |
| | 2 | 034950631 | YOKOHAMA PLANT | | |
| | | | | | |
| 2 | 1 | 034919191 | TOKYO HEAD OFFICE | | |
| | 2 | 064542651 | OSAKA 1ST PLANT | | |
| | 3 | 064542685 | OSAKA 2ND PLANT | | |
| | 4 | 069081480 | KOBE BRANCH | | |
| | 5 | 0526811780 | KOBE 1ST PLANT | | |
| | | | | | |
| N | 1 | 0922813838 | FUKUOKA BRANCH | | |
| | 2 | 0878211377 | NAGASAKI BRANCH | | |
| | | | | | |

NETWORK SYSTEM WITH A PLURALITY OF NODES FOR ADMINISTRATING COMMUNICATIONS TERMINALS

This application is a continuation of application Ser. No. 07/878,699 filed May 5, 1992 and now abandoned.

BACKGROUND OF THE INVENTION

1. Field of the Invention

The present invention relates to a network system and a store and forward machine associated with this network.

2. Description of the Prior Art

Recently, there has been known a network system which consists of a plurality of store and forward machines, and each store and forward machine includes at least one facsimile terminal and serves as a node of the network.

FIG. 1 is a schematic drawing showing one example of this kind of network system. A plurality of communication terminals 1 are connected to a store and forward machine 2, so that the store and forward machine 2 can administrate these associated communication terminals 1. And, this store and forward machines 2 is connected to a common network 3 as a node, so that communication (i.e. inter-exchange or transmission) between any nodes can be carried out through this network 3.

FIG. 3 is an example of a communication terminal administration table utilized in the store and forward machine 2 for administrating communication terminals 1, in which all the identification numbers of communication terminals 1 and their network addresses (for example, telephone numbers) are listed up in a table.

In a network system constituted as described above, all the communication terminal administration table must be identical with each other for inherent communication purpose. Therefore, if any change including addition and deletion with respect to a certain communication terminal 1 occurs, it is mandatorily required to correct not only a communication terminal administration table in one specific store and forward machine 2 which administrates above certain communication terminal 1 causing the change, but also other communication terminal administration tables stored in all the remaining store and forward machines 2.

To correct a content of each communication terminal administration table in accordance with certain changes, each store and forward machine 2 is equipped with a console 22 so that an operator can change the content of the administration table.

However, as the network system expands its scale, the number of the store and forward machines 2 increases correspondingly. Therefore, correcting works by operators become nuisance as a whole and, thus, it becomes difficult to adopt above method as a routine method.

In view of such circumstances, Japanese Laid-open Patent Application No. HEI 1-166643 proposes a system shown in FIG. 4 in which a central administration apparatus 4 is newly provided as a node, so that all the data in the communication terminal administration tables of respective nodes can be automatically renewed in response to a changing operation by the central administration apparatus 4.

However, even in such a system, the correcting work cannot be so facilitated as expected, because the correcting work itself, if concentrated to the central administration apparatus 4, would become a fairly large amount. And also, in view of simplification of the system, it is not desirable to install the central administration apparatus 4 in addition to store and forward machines 2.

SUMMARY OF THE INVENTION

The present invention has a purpose, in view of above problems and disadvantages encountered in the conventional art, to provide a network system capable of easily correcting communication terminal administration data identically in respective nodes (i.e. store and forward machines 2) without specially requiring installation of any additional hardware.

To accomplish above purpose, a first aspect of the present invention provides a network system comprising at least two nodes each administrating a plurality of communication terminals, and each of said nodes having a memory means for memorizing not only data of its own administrating communication terminals but data of other communication terminals administrated by other nodes, and further said each node being effected to notify any change occurring in its own administrating communication terminals to other nodes in the network system.

With this arrangement, it becomes possible for a store and forward machine to administrate data of communication terminals connected to other store and forward machines as well as data of own communication terminals, without installing any special hardware such as a central administration apparatus.

In such a network system, when any change occurs in a communication terminal administration table in a certain store and forward machine, it will be preferable for said certain store and forward machine to change other communication terminal administration table administrated by other store and forward machines through the network, in addition to its own communication terminal administration table.

Otherwise, it will be also preferable for said certain store and forward machine to instruct other store and forward machines to correct their administrating corresponding administration data by themselves.

Further the present invention has a purpose to provide a network system capable of easily correcting administration data of respective nodes not only identically but in a short time, without specially requiring installation of any additional hardware.

To realize this end, a second aspect of the present invention provides a network system comprising at least two nodes each administrating a plurality of communication terminals, and each of said nodes having a memory means for memorizing important information such as telephone numbers and less important information such as name of locations of not only its own administrating communication terminal but other communication terminals administrated by other nodes, and said each node being effected to change the important information such as telephone numbers of all the communication terminals to be changed prior to changes of less important other items.

With this arrangement, an interruption in the network for the correcting work can be shortened. That is, usually the correcting work requires a significant long time if all the data changes are carried out at the same time. But, in accordance with the second aspect of the present invention, correction works are separated into at least two groups; i.e. correction of telephone numbers and correction of other items. Thus, the network can resume in a normal communication condition within a relatively short time. Therefore, bad affection caused by the interruption of communication can be suppressed as less as possible.

Moreover, the present invention has a purpose to provide a network system capable of easily correcting administration data of respective nodes even in the case where the administration data includes a data relating to an unchangeable communication terminals without specially requiring installation of any additional hardware.

To realize this end, a third aspect of the present invention provides a network system comprising at least two nodes each administrating a plurality of communication terminals, and each of said nodes having a memory means for memorizing not only data of its own administrating communication terminals but data of other communication terminals administrated by other nodes, and further said node prohibiting a correction of data relating to a communication terminal which is predetermined as an unchangeable communication terminal even if it receives a changing request from other nodes.

With this arrangement, according to the third aspect of the present invention, an undesirable administration data change with respect to the unchangeable communication terminal is surely prevented.

Still further, the present invention has a purpose to provide a network system capable of preventing a double registration in correcting the administration data.

To this end, a fourth aspect of the present invention provides a network system comprising at least two nodes each administrating a plurality of communication terminals, and each of said nodes having a memory means for memorizing telephone numbers of not only its own administrating communication terminal but other communication terminals administrated by other nodes, and said each node being effected not to change its data memorized in its own memory means unless it has confirmed that the same telephone number as a telephone number requested to register does not exist in its own memory means.

With this arrangement, in each correcting operation, it is checked whether or not the same telephone number as a telephone number requested to register exists in its own memory means. Therefore, an occurrence of the double registration is surely prevented.

Yet further, the present invention has a purpose to provide a network system capable of easily correcting administration data even in the case where an additional node or a communication terminal is newly installed.

To attain this purpose, a fifth aspect of the present invention provides a network system comprising at least two nodes each administrating a plurality of communication terminals, and each of said nodes having a memory means for memorizing not only data of its own administrating communication terminals but data of other communication terminals administrated by other nodes, and any one of nodes transmitting all the content of the memory means to a newly installed node, and to the contrary, said newly installed node transmitting all the information relating to its own administrating communication terminals to other nodes.

With this arrangement, the newly installed node and other nodes can easily share their information.

The above and other objects, features and advantages of the present invention will become more apparent from the following detailed description which is to be read in conjunction with the accompanying drawings.

BRIEF DESCRIPTION OF THE DRAWINGS

FIG. 3 is one example of a communication terminal administration table;

FIG. 6 is a modified administration table of FIG. 3 by adding a new communication terminal;

FIG. 7 is one example of a node address table;

FIG. 8 is another modified administration table of FIG. 3 by omitting one communication terminal;

FIG. 9 is still another modified administration table of FIG. 3 by changing one communication terminal;

FIG. 17 is one example of a communication terminal administration table before a changing operation is carried out in accordance with flow charts of FIGS. 14 and 15;

FIG. 18 is the communication terminal administration table after the changing operation has been carried out in accordance with flow charts of FIGS. 14 and 15;

FIG. 19 is the communication terminal administration table in which a data relating to an unchangeable terminal is renewed to the previous data;

FIG. 20 is one example of a communication terminal administration table in which a network address instructed to change is the same as a network address already registered in the communication terminal administration table;

DETAIL DESCRIPTION OF THE PREFERRED EMBODIMENT

Figure 1:
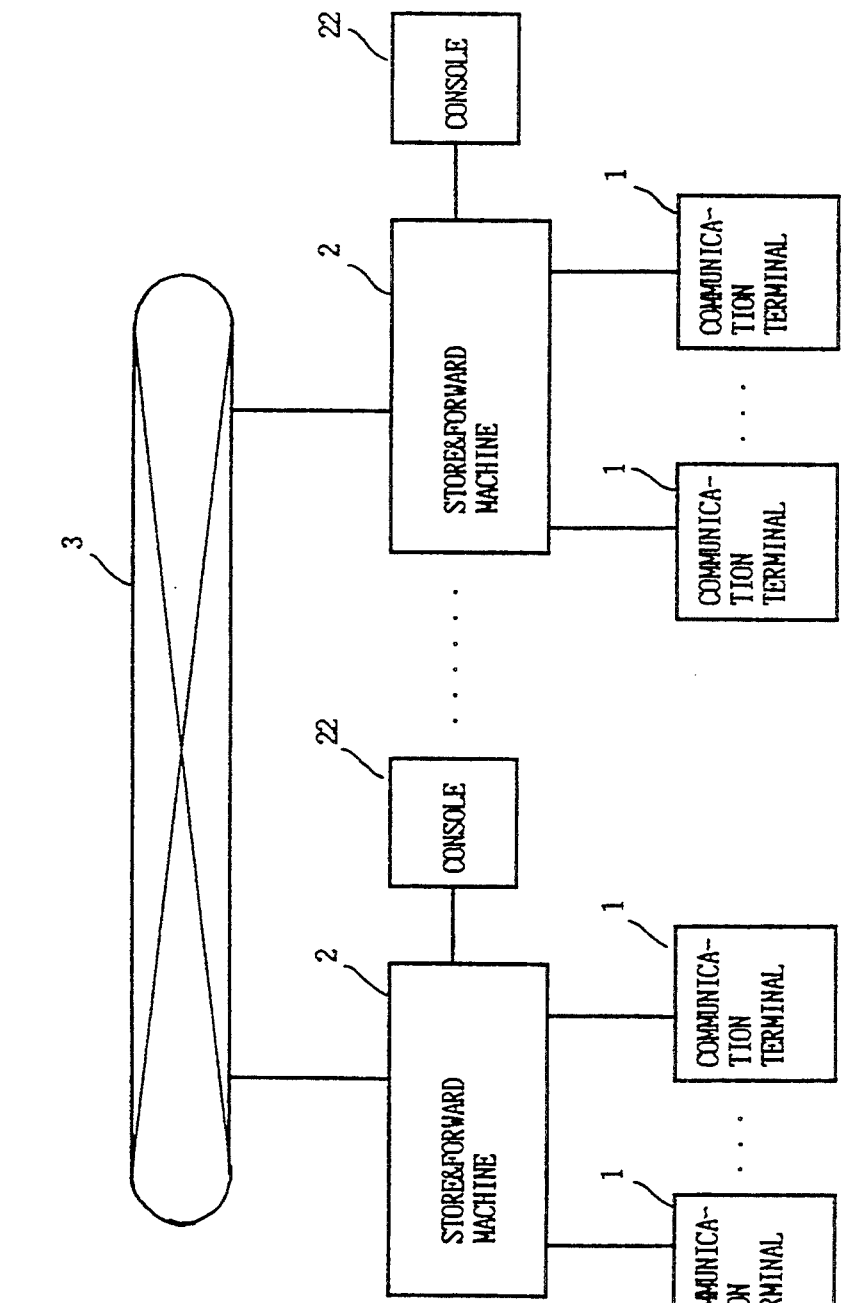
FIG. 1 is a schematic diagram of a network system in accordance with an embodiment of the present invention.
Figure 2:
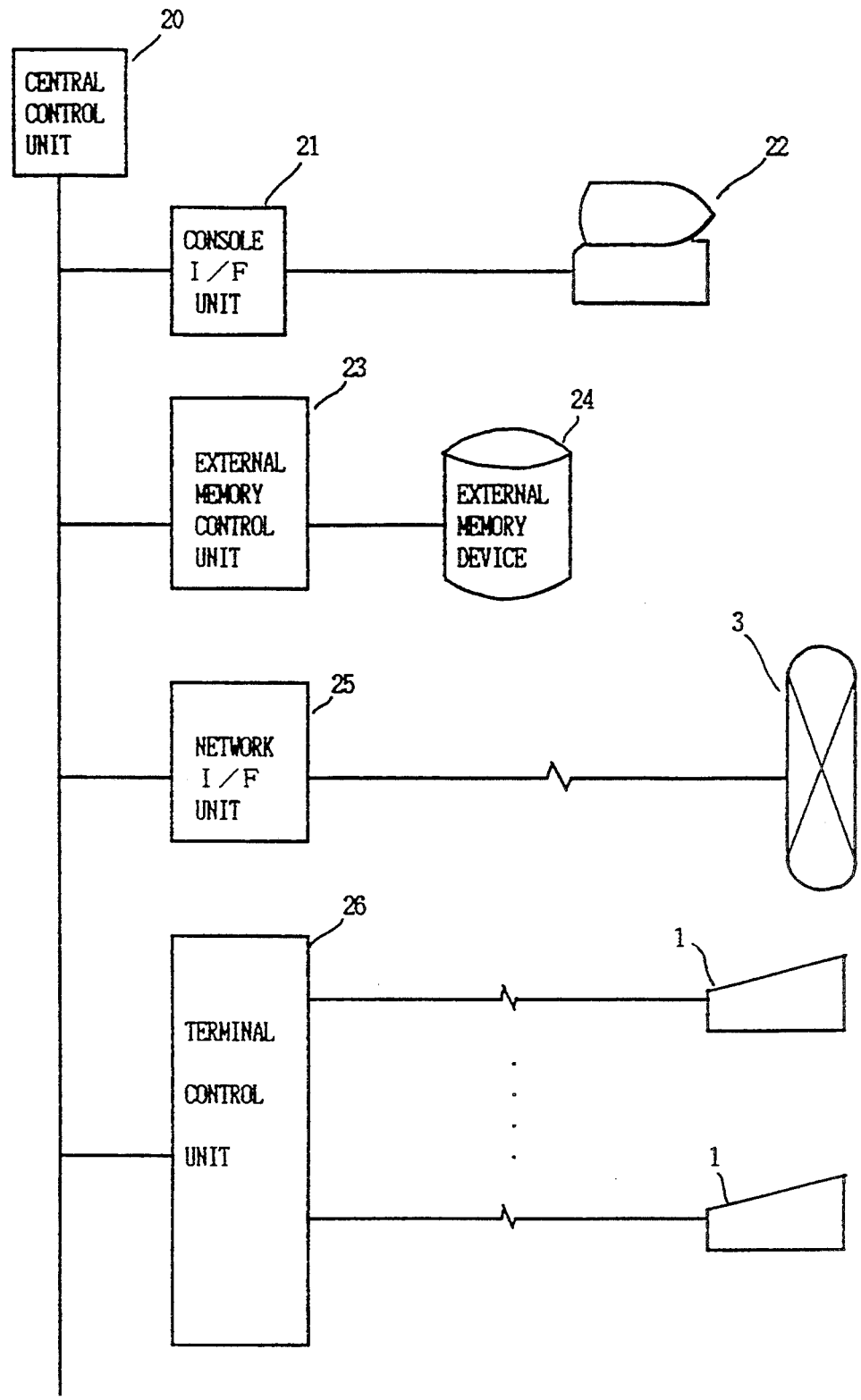
FIG. 2 is a block diagram illustrating a constitution of a store and forward machine.
Figure 4:
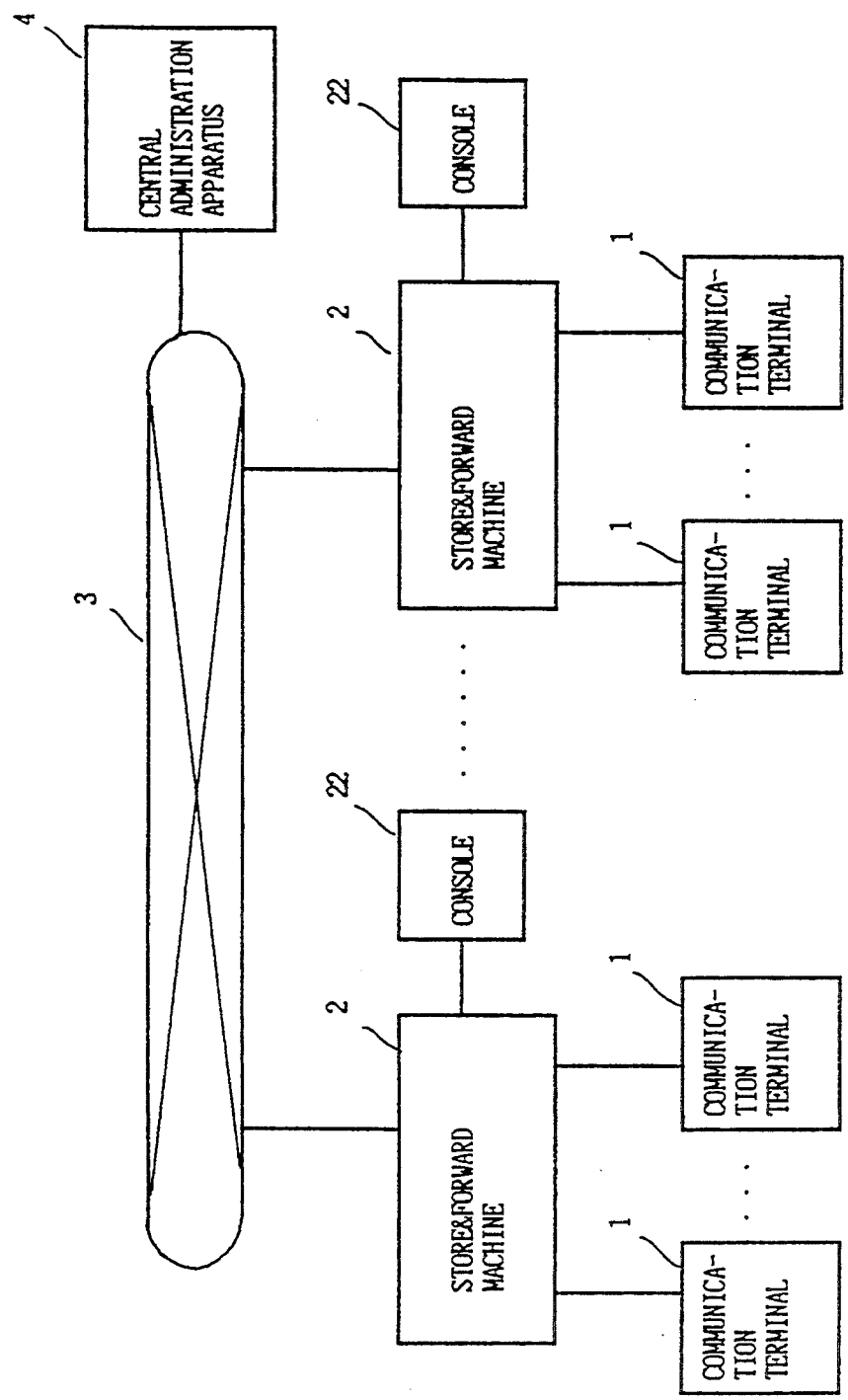
FIG. 4 is a schematic diagram of a network system in which a central administration apparatus is equipped for changing data of respective nodes in the system.

Hereinafter, referring now to the accompanying drawings, an embodiment of the present invention is explained in detail. FIG. 1 is a schematic diagram of a network system in accordance with an embodiment of the present invention. And, FIG. 2 is a block diagram illustrating a constitution of a store and forward machine 2. In FIG. 2, a central control unit 20 carries out an overall control including relationships with a store and forward machine 2, a communication terminal 1, and a network 3. A console interface unit 21 controls a console 22 which performs input and output operations. An external memory device 24 stores communication data for transmitting to and receiving from the communication terminals 1 and administration data used for the administration in the store and forward machine 2. This external memory device 24 is controlled by an external memory control unit 23. A network interface unit 25 serves as an interface with respect to the network 3. A terminal control unit 26 controls the communication terminal 1.

An operation of a network system comprising the network 3 associated with the store and forward machines 2 as their nodes is explained hereinafter.

Figure 5:
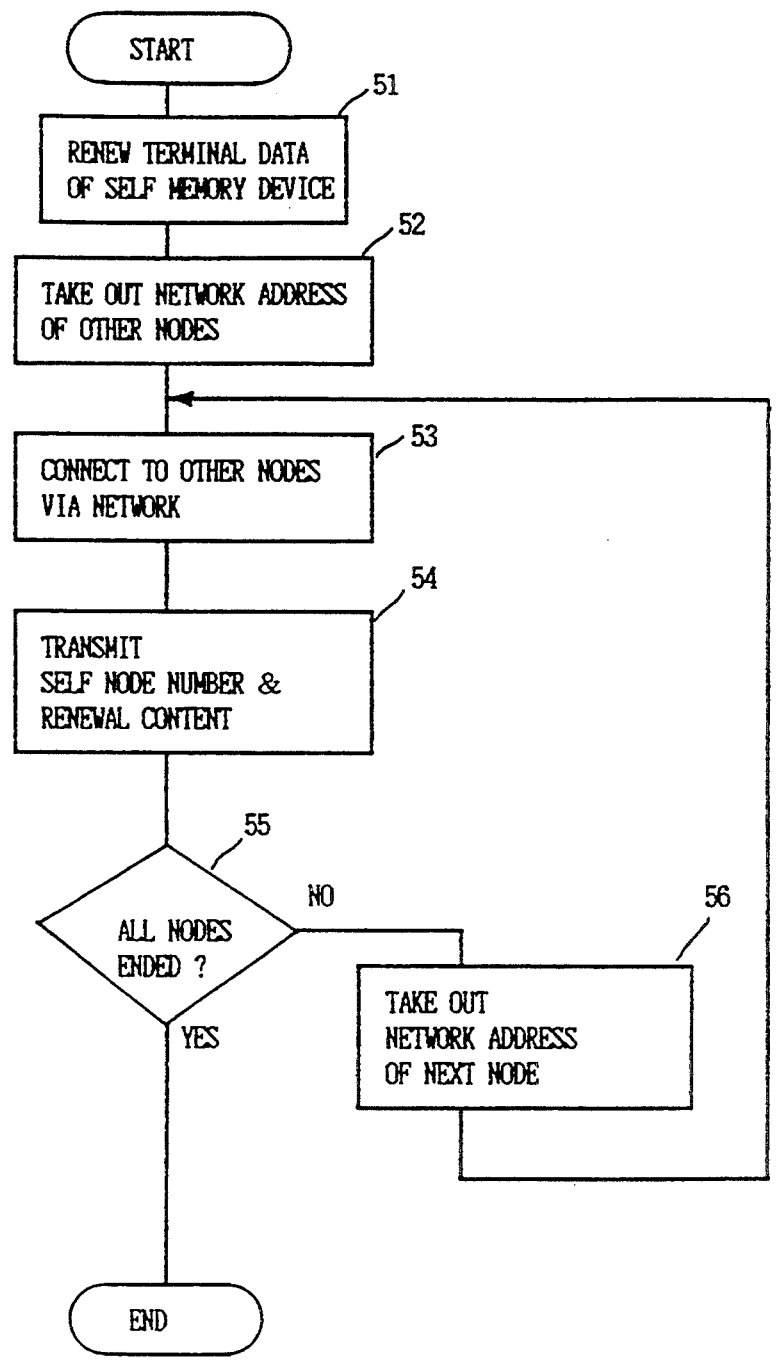
FIG. 5 is a flow chart illustrating a changing operation for changing content of own memory means.

FIG. 5 shows an action flow in the store and forward machine 2 in the case where the change including an addition and a deletion occurs in its own administrating communication terminals 1. (Hereinafter, the store and forward machine 2 is also referred as a control side store and forward machine 2 or a control side node)

In this flow chart, in a step 51, an operator of this store and forward machine 2 operates the console 22 to input contents of changes so as to renew the communication terminal administration table shown in FIG. 3. FIG. 6 shows a modified administration table by adding a new communication terminal No. 6 to the store and forward machine 2 of a node No. 2. Compared with the administration table shown in FIG. 3, an item of node No. 2, communication terminal No. 6, network address 0783324420 is added. The administration table optionally includes terminal information each explaining a content of corresponding communication terminal such as a location where the communication terminal is established.

Next, in a step 52, a network address of an other node (i.e. store and forward machine 2) is taken out (i.e., obtained) from the node address table shown in FIG. 7. In a step 53, the selected other node is connected through the network 3 to the No.2 node which renewed the content of administration table in a previous step 52.

Then, in a step 54, the node number (i.e. No. 2) and the renewed content (i.e. communication terminal No. 6, network address 0783324420) are transmitted to this selected other node from the No. 2 node. Subsequently, in a step 55, it is checked whether or not the renewed content is transmitted to all the remaining nodes other than the No. 2 node. If there is any node remaining not renewed, the program proceeds to a step 56 to take out a network address of any remaining other node from the node address table shown in FIG. 7. Then, the same procedure of the steps 53, 54, and 55 are repeated. And, if transmission of data to all the nodes are finished, the program ends its action flow.

Here, the content of changes includes not only addition but also deletion or exchange. FIGS. 8 and 9 are other examples showing changes in the communication terminal administration table. FIG. 8 shows an administration table which is modified by omitting one communication terminal of a node No. 2, communication terminal No. 3, from the administrating table of FIG. 3. And, FIG. 9 shows still another modified administration table of FIG. 3 by changing a network address and a terminal information of a node No. 2, communication terminal No. 2.

Figure 10:
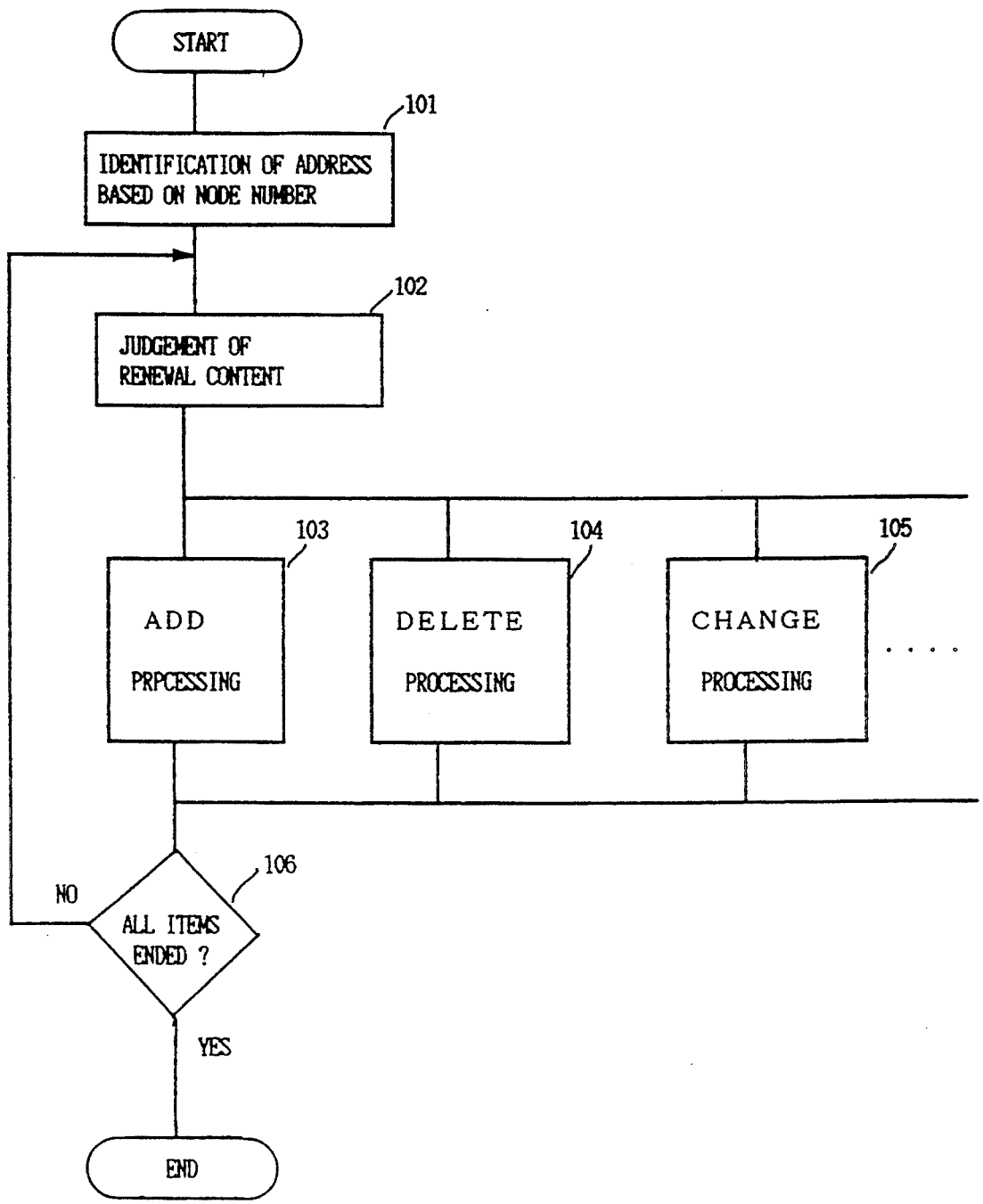
FIG. 10 is a flow chart illustrating a changing operation in case of receipt of a changing request from other nodes.

FIG. 10 shows an action flow in a store and forward machine 2 (hereinafter, referred to as a controlled side store and forward machine 2 or a controlled side node) which receives a change notice from an other store and forward machine 2 (i.e. the control side node). In this flow chart, in step 101, an address of a communication terminal 1 to be modified by using a communication terminal administration table shown in FIG. 3 is identified through a node number of control side node. Next, in step 102, a content to be renewed in the administration table is judged and, subsequently, according to the result of judgement of the step 102 the program proceeds to any one of an ADD processing (step 103), a DELETE processing (step 104), and a CHANGE processing (step 105). Then, in a step 106, it is checked whether or not all the items are finished. If there is any item remaining unchanged, the program returns to the step 102 and repeats the procedures of the steps 102 through 105. And, if all the changing operations are completed, the program ends its action flow.

The above description explains an overall operation in changing the content of the communication terminal administration table. The communication terminal administration table consists of, as shown in FIGS. 3, 6, 8, and 9, node numbers discriminating respective store and forward machines 2, communication terminal numbers showing respective communication terminals 1 connected to each store and forward machine 2, network addresses (for example, telephone numbers) discriminating each communication terminal, and terminal information such as a location name where the communication terminal is established. Among these data, in view of importance in the network system, the node numbers, the communication terminal numbers, and the network addresses are categorized into mandatory data. To the contrary, the terminal information is rather categorized into optional data which are convenient for users.

Therefore, it is preferable to carry out a renewal operation of important data prior to less important data so that the network can resume in a normal operational condition first of all. Then, a renewal operation of less important data can be carried out later. In this case, it is recommendable to provide different memory spaces for important data and less important data separately.

Figure 11:
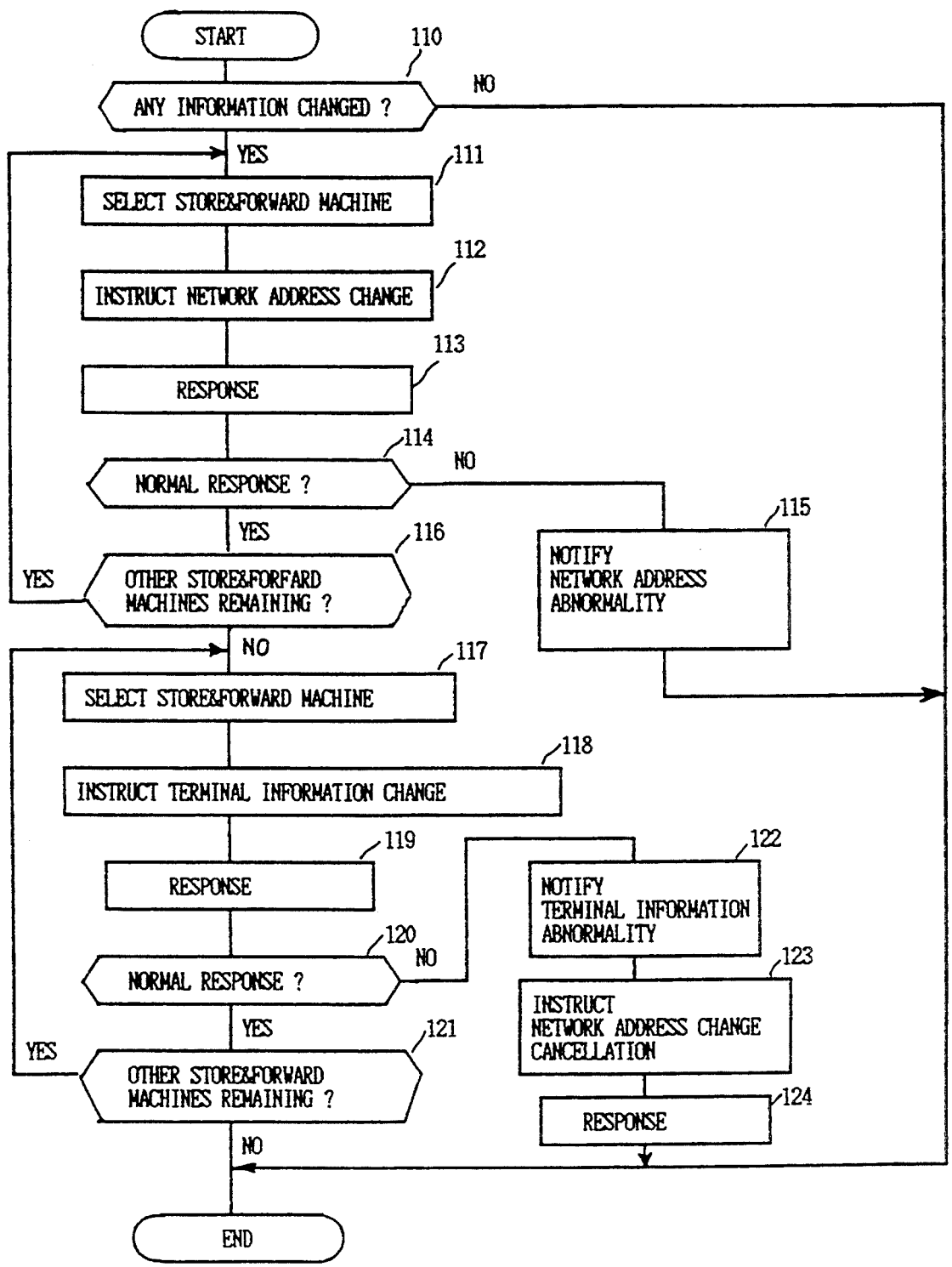
FIG. 11 is a flow chart illustrating a changing operation of a communication terminal administration table carried out in a control side store and forward machine which instructs changes.

FIG. 11 shows an action flow in the case where one store and forward machine 2 (i.e. a control side node) instructs other store and forward machines 2 (i.e. controlled side nodes) to correct their own communication terminal administration tables. In this case, the control side node can change its own communication terminal administration table by itself, or can change it by instructing an other node to change it.

In the flow chart of FIG. 11, in a step 110, it is checked if there is any change regarding the information of communication terminal administration table. If there is any change in the step 110, the program proceeds a step 111 to select a store and forward machine 2 having data to be renewed. And, the change of network address is instructed in a step 112. Further, in a step 113, a response is received from the above selected store and forward machine 2 having data to be renewed. It is checked whether or not the response indicates a normal change, in a step 114. If the response in the step 114 is not normal, an abnormality of the network address change is notified to respective store and forward machines 2 in a step 115 and, in turn, the program ends its action flow.

If the response in the step 114 is normal, it is checked whether or not there is any other store and forward machine remaining unchanged, in a step 116. If the judgement in the step 116 is YES, the program returns to the step 111 to repeat the same procedure. When all the network address changes are finished in the respective communication terminal administration tables, the network can resume in a normal operating condition.

Next, the program proceeds to a changing flow of the terminal information in the communication terminal administration table. In a step 117, a store and forward machine 2 having data to be renewed is selected. And, the change of terminal information is instructed in a step 118. Further, in a step 119, a response is received from the above selected store and forward machine 2 having data to be renewed. It is checked whether or not the response indicates a normal change, in a step 120. If the response in the step 120 is normal, it is checked whether or not there is any other store and forward machine remaining unchanged, in a step 121. If the judgement in the step 121 is YES, the program returns to the step 117 to repeat the same procedure. If the judgement in the step 121 is NO, the program ends its action flow.

If the response in the step 120 is not normal, an abnormality of the terminal information change is notified to respective store and forward machines 2 in a step 122 and, in turn, in the next step 123, any network addresses already changed through the above steps 111 to 114 are renewed to return to the previous data so as to cancel the network address change operation. This step is carried out to maintain the conformity between the network address and the terminal information. Then, in a step 124, the program receives responses from respective store and forward machines when the resume operation are carried out adequately. And subsequently, the program ends its action flow.

Figure 12:
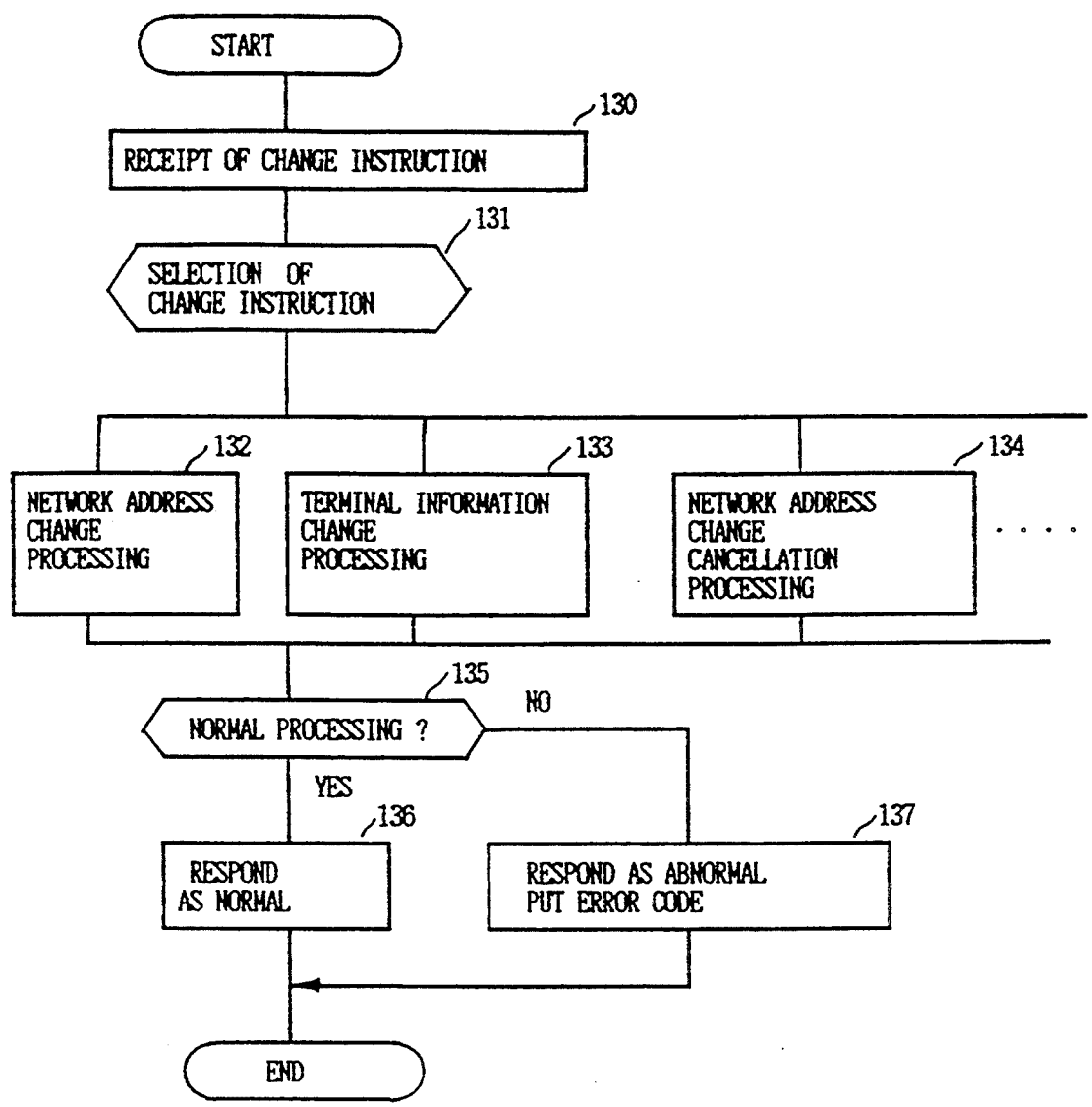
FIG. 12 is a flow chart illustrating a changing operation of a communication terminal administration table carried out in a controlled side store and forward machine which receives the instruction from the control side store and forward machine.

FIG. 12 shows an action flow of the store and forward machine (i.e. the controlled node) 2 which receives the instruction from the control node in the flow chart of FIG. 11.

In this flow chart, in a step 130, the change instruction is received first of all. In the next step 131, one of change processing is selected in response to the instruction. Then, according to the selection in the step 131, any one of a network address change processing (i.e. step 132), a terminal information change processing (i.e. step 133), and a network address change cancellation processing (i.e. step 134) is carried out. Next, it is checked whether or not the processing has been carried out normally in a step 135. If the judgement in the step 135 is normal, a normal response is transmitted to the control node in a step 136. If the judgement in the step 135 is not normal, an abnormal response is transmitted to the control node with an error code in a step 137.

Figure 13:
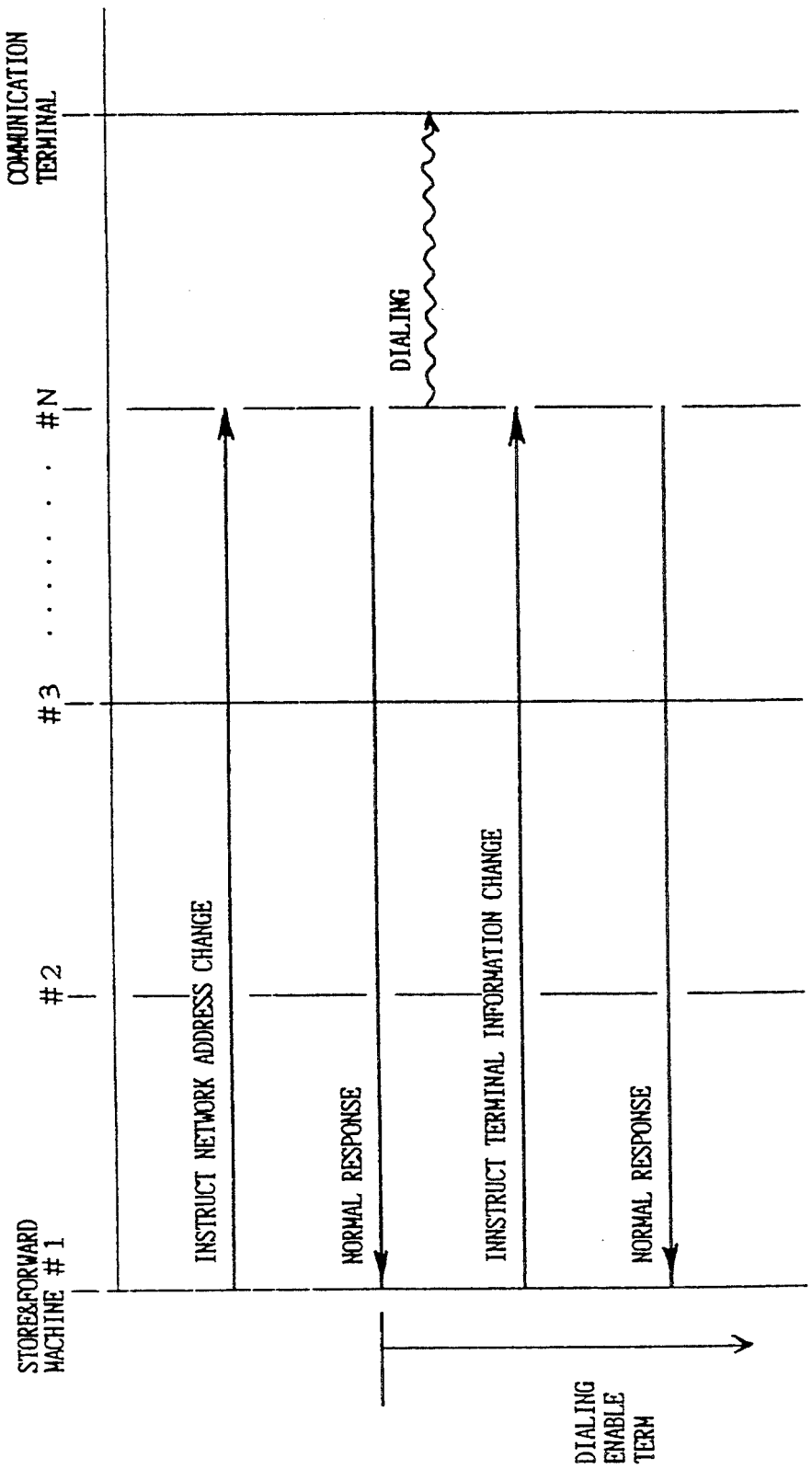
FIG. 13 is a time chart showing a network address change and a terminal information change.

FIG. 13 shows a time chart of the operation of FIG. 11, wherein a dialing enable term is shown. That is, the network can resume in a normal operational condition after the network address change in the respective store and forward machines are finished. Thus, the dialing can be allowed as shown in the drawing.

In this manner, each node is effected to change the important data such as telephone numbers of communication terminals to be changed prior to changes of less important other items. Therefore, an interruption of communication for correcting works can be shortened. That is, as the number of nodes connected to the network increases, the correcting work require a significant longer time if all the data changes are carried out at the same time.

But, in accordance with this embodiment of the present invention, these correction works are separated into at least two groups; i.e. correction of important data such as telephone numbers and correction of less important data such as other items. Thus, the network can resume in a normal communication condition within a relatively short time. Therefore, bad effects caused by the interruption of communication can be suppressed to be as few as possible.

Figure 14:
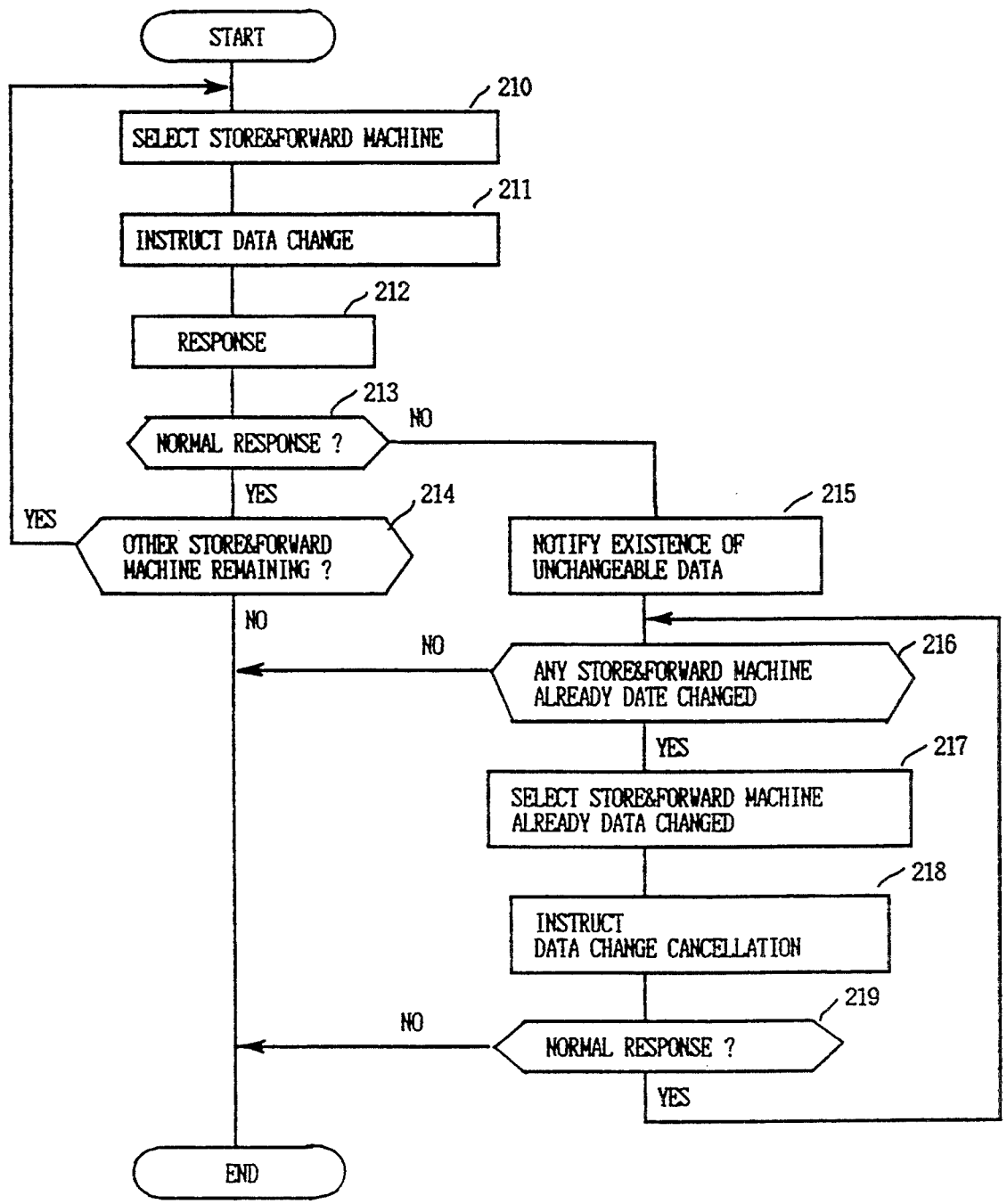
FIG. 14 is a flow chart illustrating an instruction of communication terminal data change from a control side store and forward machine to other store and forward machine.

Next, referring now to FIGS. 14 to 19, the flow charts and relationships therein illustrate a changing operation in the case where a particular communication terminal 1 is prohibited to change its network address. FIG. 14 is a flow chart illustrating a communication terminal data change instructed from a control side node to other nodes.

In the flow chart of FIG. 14, in a step 210, the program selects one of store and forward machines 2 including itself which has data to be renewed. And, the change of administration table is instructed to this selected store and forward machine 2 in a step 211. Further, in a step 212, a response is received from the above selected store and forward machine 2. Then, it is checked whether or not the changing operation is accomplished as scheduled, in a step 213. If the judgement in the step 213 is YES, it is subsequently checked in a step 214 whether or not there is any other store and forward machine remaining unchanged. If the judgement in the step 214 is YES, the program returns to the beginning. On the other hand, if the judgement in the step 214 is NO, the program ends its action flow.

In the case where the response in the previous step 213 is not normal; that is, in the case where a particular communication terminal 1 is prohibited to change its network address, an existence of an unchangeable data is notified or responded so as not to be undesirably changed, in a step 215. In this case, a network address corresponding to the above particular communication terminal 1 is not changed. Other items are changed.

Next, in a step 218, it is checked whether or not there are any other store and forward machines 2 having already changed the data of own communication terminal administration in accordance with the instruction from the control node. If the judgement in the step 216 is YES, the program selects one store and forward machine 2 to be corrected, in a step 217, and subsequently, instructs to cancel the already performed data change operation to return the corresponding data to the previous data, in a step 218. Then, in a step 219, it is judged whether or not a response generated from the instructed store and forward machine is normal. If the response generated from the instructed store and forward machine is normal in the step 219, the program returns to the step 216. To the contrary, if the response is not normal in the step 219, the program ends its action flow. That is, all the procedures are interrupted to investigate the cause of this trouble.

Figure 15:
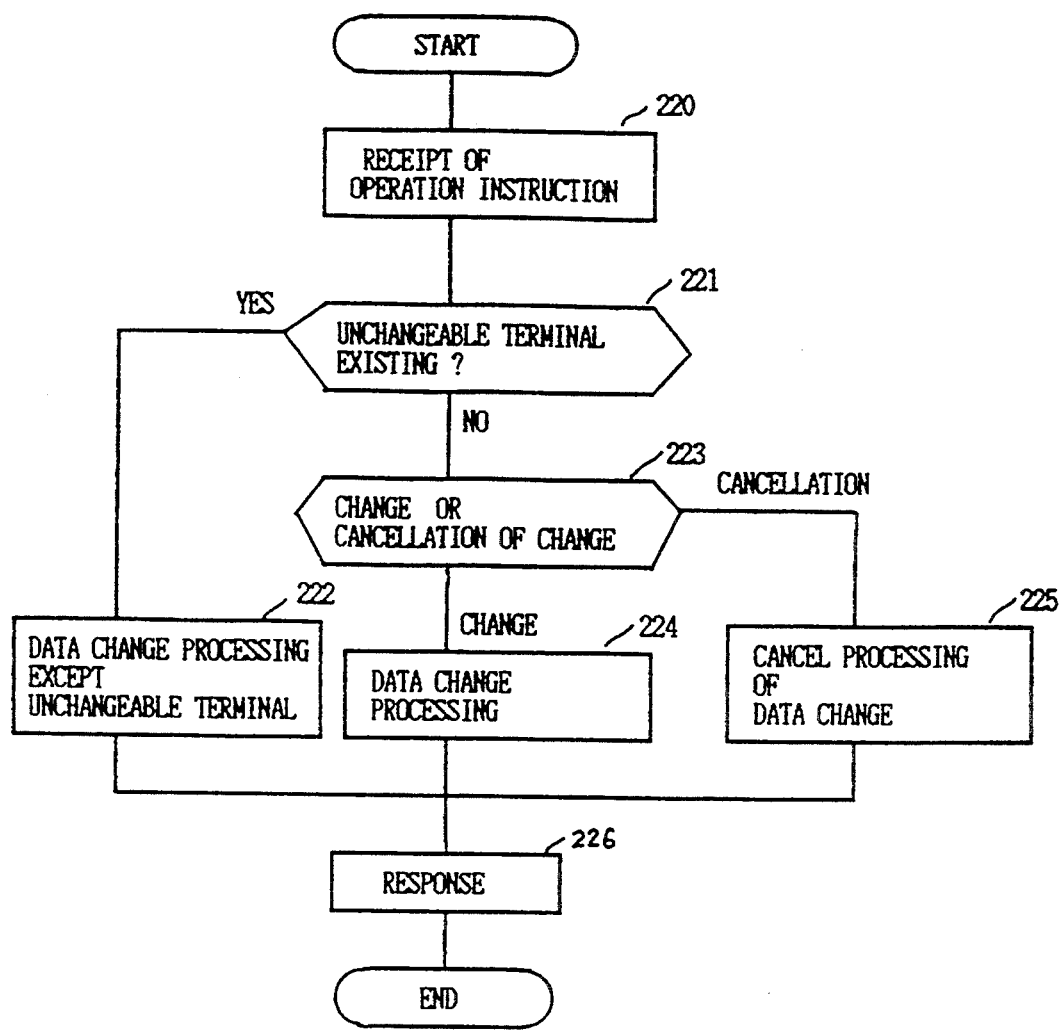
FIG. 15 is a flow chart illustrating an action performed in the controlled side store and forward machine which receives the instruction from the control side store and forward machine.

FIG. 15 shows an action flow performed in the controlled side store and forward machine 2 which receives the instruction from the control side store and forward machine 2.

In this flow chart, the program receives the instruction for changing operation from the control side store and forward machine 2, in a step 220. It is checked whether or not there is any unchangeable communication terminal 1 included in the instruction, in a step 221. If the judgement in the step 221 is YES, all the instructed data except the unchangeable terminal are changed in a step 222. And, in a step 226, it is responded to the control side store and forward machine 2 that the unchangeable terminal exists and any other changes have been finished.

In the case where there is no unchangeable communication terminal 1, it is checked whether the instructed change is a data change or a cancellation of data change, in a step 223. If the instructed change is the data change, a data change processing is carried out in a step 224. On the other hand, if the instructed change is the cancellation of data change, a cancel processing is carried out in a step 225. And, it is responded in the step 226 in a similar manner.

Figure 16:
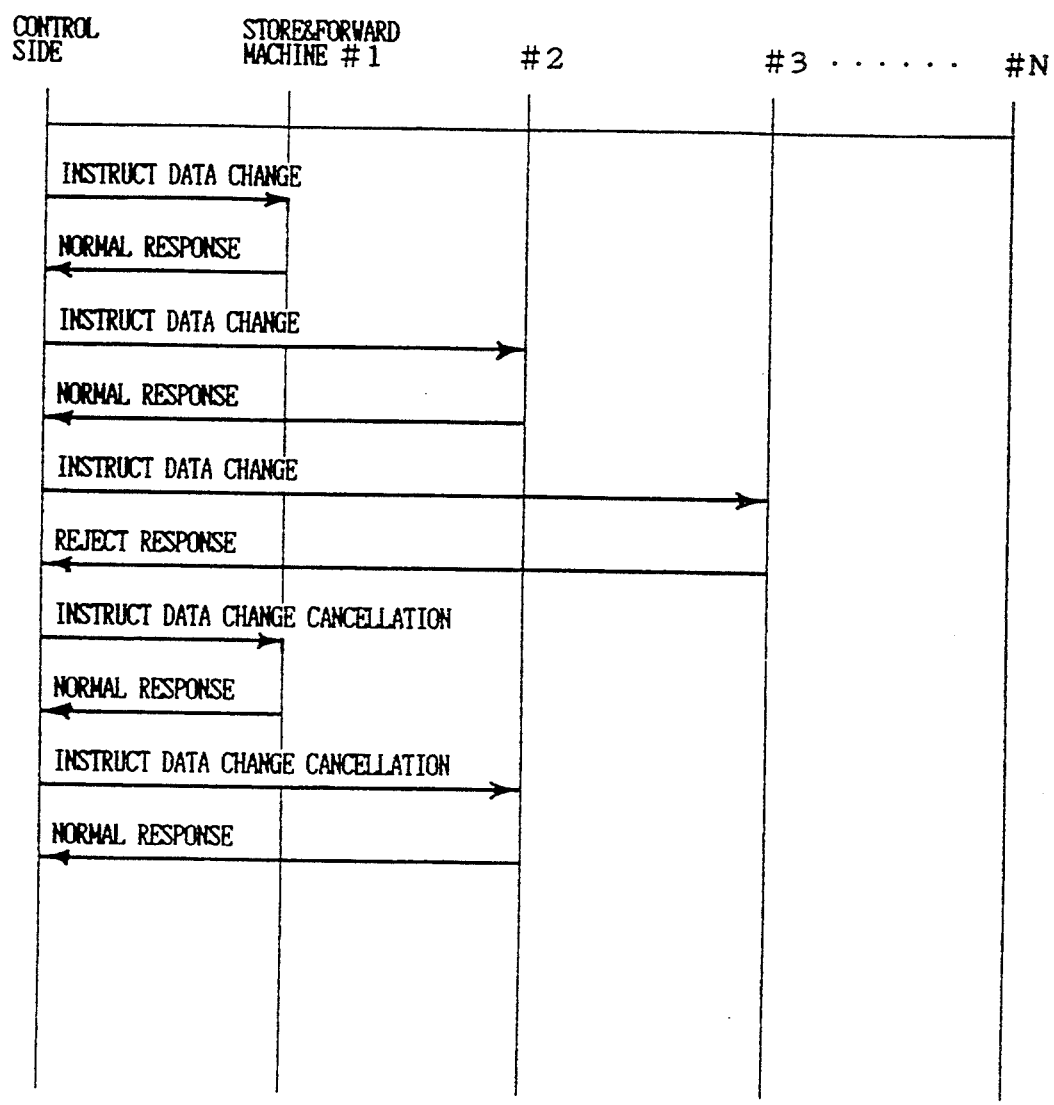
FIG. 16 is a view showing relationship between instructions and their responses in accordance with flow charts of FIGS. 14 and 15.

FIG. 16 shows the relationship between instructions and their responses in accordance with flow charts of FIGS. 14 and 15, wherein the No.3 store and forward machine includes an unchangeable terminal.

FIG. 17 is one example of a communication terminal administration table before the changing operation is carried out in accordance with flow charts of FIGS. 14 and 15, wherein the No. 2 communication terminal in the No. 1 node has previously changed its network address and terminal information. As shown in FIG. 17, the previous network address and the terminal information are listed in the column of an "Old Network Address" and an "Old Terminal Information".

FIG. 18 shows a condition of above communication terminal administration table after the changing operation has been done in accordance with flow charts of FIGS. 14 and 15. That is, a network address and a terminal information of the No. 1 communication terminal in the No. 1 node is changed from FIG. 17 to FIG. 18.

FIG. 19 shows a condition of above communication terminal administration table in which data relating to the unchangeable terminal are returned to the previous data; i.e the data listed in the "Old Network Address" and the "Old Terminal Information".

Accordingly, in this embodiment, each node prohibits to correct data relating to a communication terminal which is designated as an unchangeable communication terminal even if it receives a changing request from other nodes.

With this arrangement, undesirable administration data change with respect to the unchangeable communication terminal is surely prevented.

Next, referring now to FIGS. 20 to 23, the case wherein the same network address to be registered is already listed in the communication terminal administration table is explained. FIG. 20 shows an exemplary case wherein it is intended to change the network number of No. 1 communication terminal to 034919191 changed, though the same number is already registered in the No. 1 communication terminal of the No. 2 node.

Figure 21:
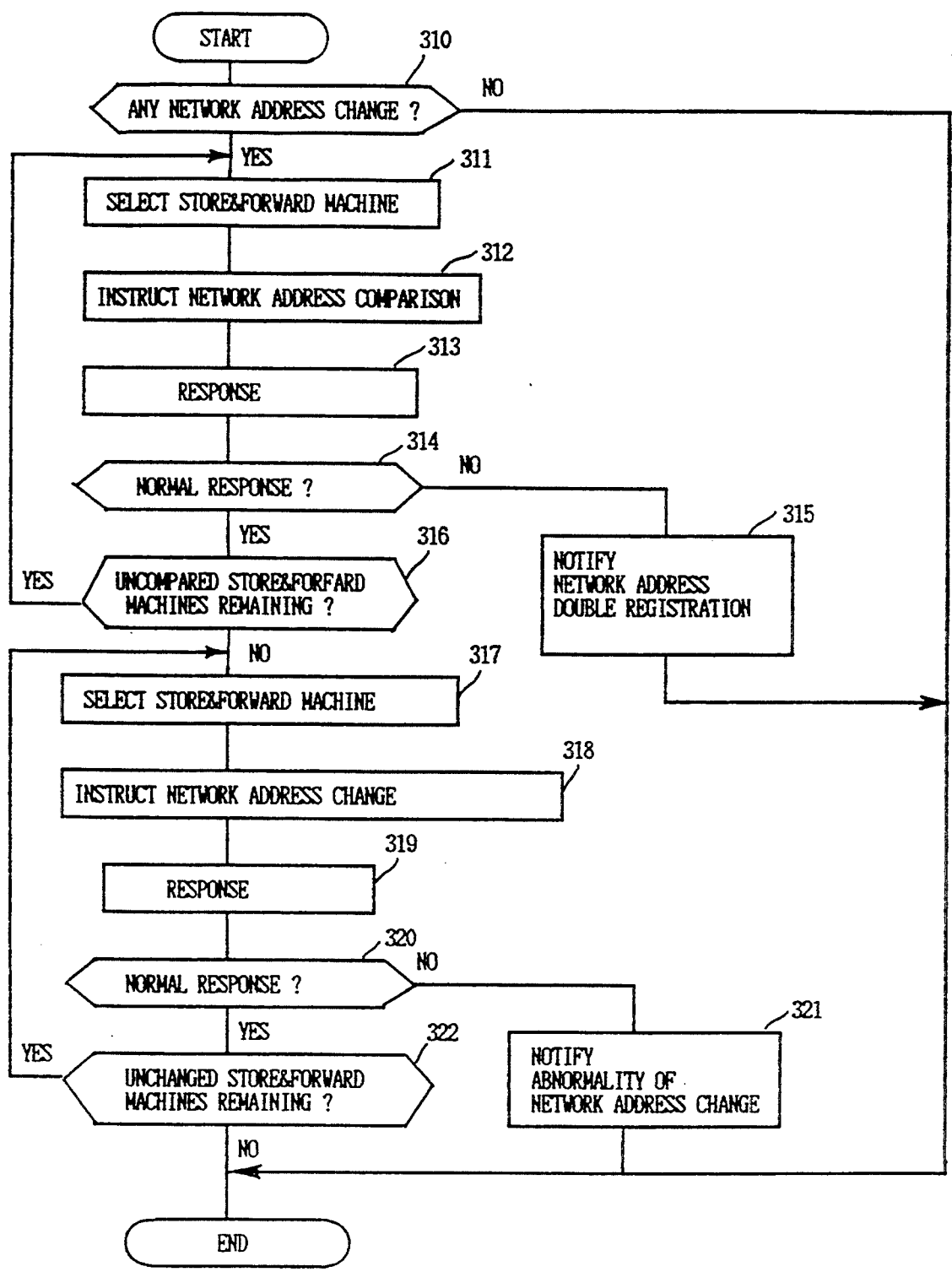
FIG. 21 is a flow chart illustrating a changing operation of communication terminal administration table capable of preventing a double registration of a network address, which is carried out in a control side store and forward machine.

FIG. 21 shows an action flow in the case where one store and forward machine 2 (i.e. a control side node) instructs other store and forward machines 2 (i.e. controlled side nodes) to correct their own communication terminal administration tables, under the condition the same network addresses are to be registered. In this case, the control side node changes its own communication terminal administration table by itself.

In the flow chart of FIG. 21, in a step 310, it is checked if there is any change regarding the network addresses of communication terminal administration tables. If there is any change in the step 310, the program proceeds a step 311 to select a store and forward machine 2 having data to be renewed. And, the comparison of network address is instructed in a step 312. That is, it is judged whether or not the same network address to be registered is already listed in the selected communication terminal administration table.

Further, in a step 313, a response is received from the selected store and forward machine 2. Then, it is checked whether or not the response indicates a normal change, in a step 314. If the response in the step 314 is not normal; i.e. an occurrence of a double registration, this double registration in the network address change is notified to an operator in a step 315 and, in turn, the program ends its action flow.

If the response in the step 314 is normal, it is checked whether or not there is any other store and forward machine remaining uncompared, in a step 316. If the judgement in the step 316 is YES, the program returns to the step 311 to repeat the same procedure. When all the network address comparisons are finished in the respective communication terminal administration tables, the program proceeds to a changing operation of the terminal information in the communication terminal administration table.

Namely, in a step 317, a store and forward machine 2 having data to be renewed is selected. And, the change of the network address is instructed in a step 318. Further, in a step 319, a response is received from the selected store and forward machine 2. It is checked whether or not the response indicates a normal change, in a step 320. If the response in the step 320 is normal, it is checked whether or not there is any other store and forward machine remaining unchanged, in a step 322. If the judgement in the step 322 is YES, the program returns to the step 317 to repeat the same procedure. If the judgement in the step 322 is NO, the program ends its action flow.

If the response in the step 320 is not normal, an abnormality of the network address change is notified to an operator in a step 321 and, in turn, the program ends its action flow.

Figure 22:
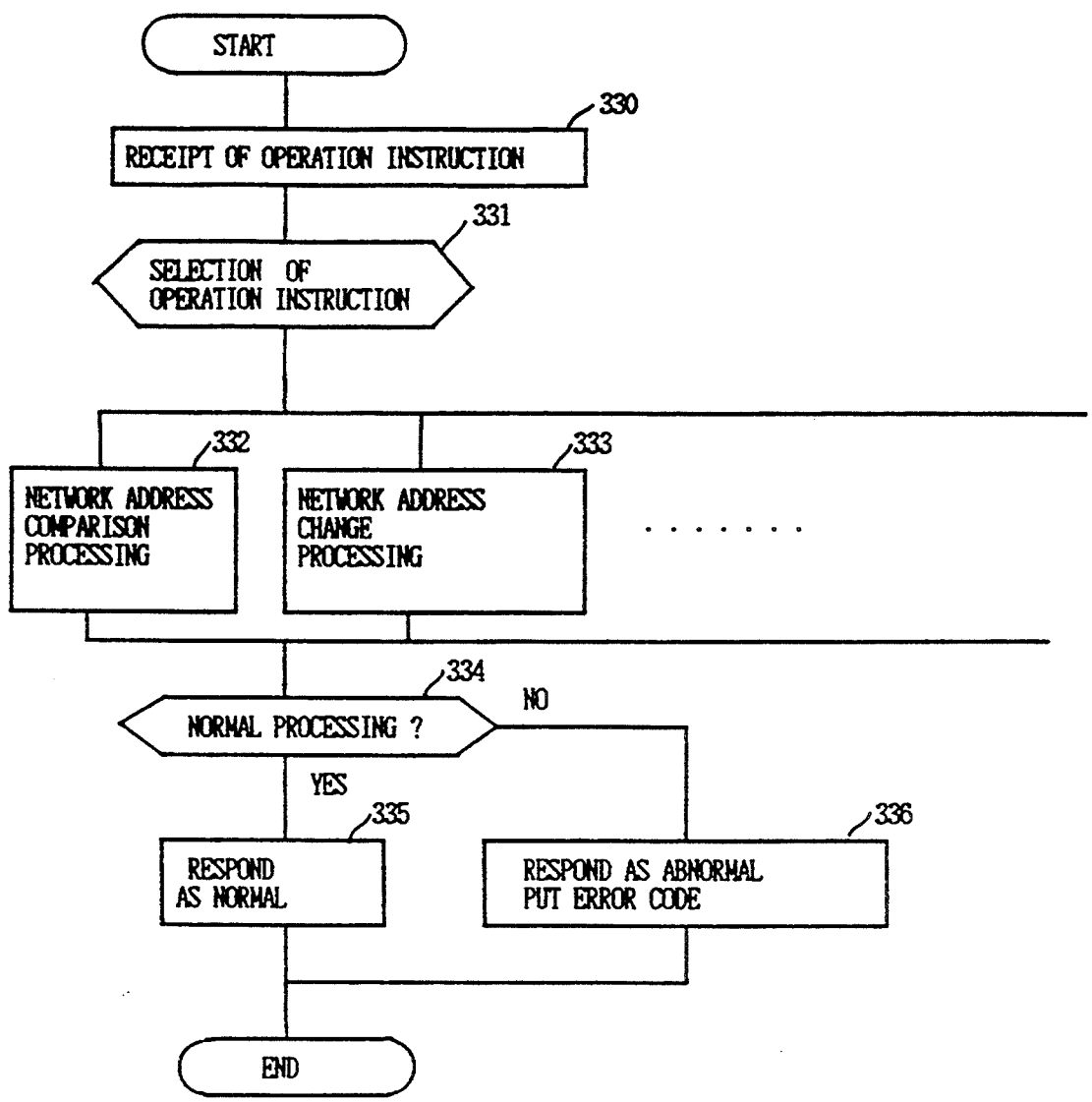
FIG. 22 is a flow chart illustrating a changing operation of a communication terminal administration table carried out in a controlled side store and forward machine which receives the instruction from the control side store and forward machine.

FIG. 22 shows an action flow of the store and forward machine (i.e. the controlled node) 2 which receives the instruction from the control node in the flow chart of FIG. 21.

In this flow chart, in a step 330, the operational instruction is received first of all. In the next step 331, one of operational processing is selected in response to the instruction. Then, according to the selection in the step 331, any one of a network address comparison processing (i.e. step 322), a network address change processing (i.e. step 323) and so on is carried out. That is, in the step 322, it is checked if the same network address are to be registered.

Next, in a step 334, it is checked whether or not the processing has been carried out normally. If the judgement in the step 334 is normal, a normal response is transmitted to the control side node in a step 335. If the judgement in the step 334 is not normal, an abnormal response is transmitted to the control side node with an error code in a step 336.

Figure 23:
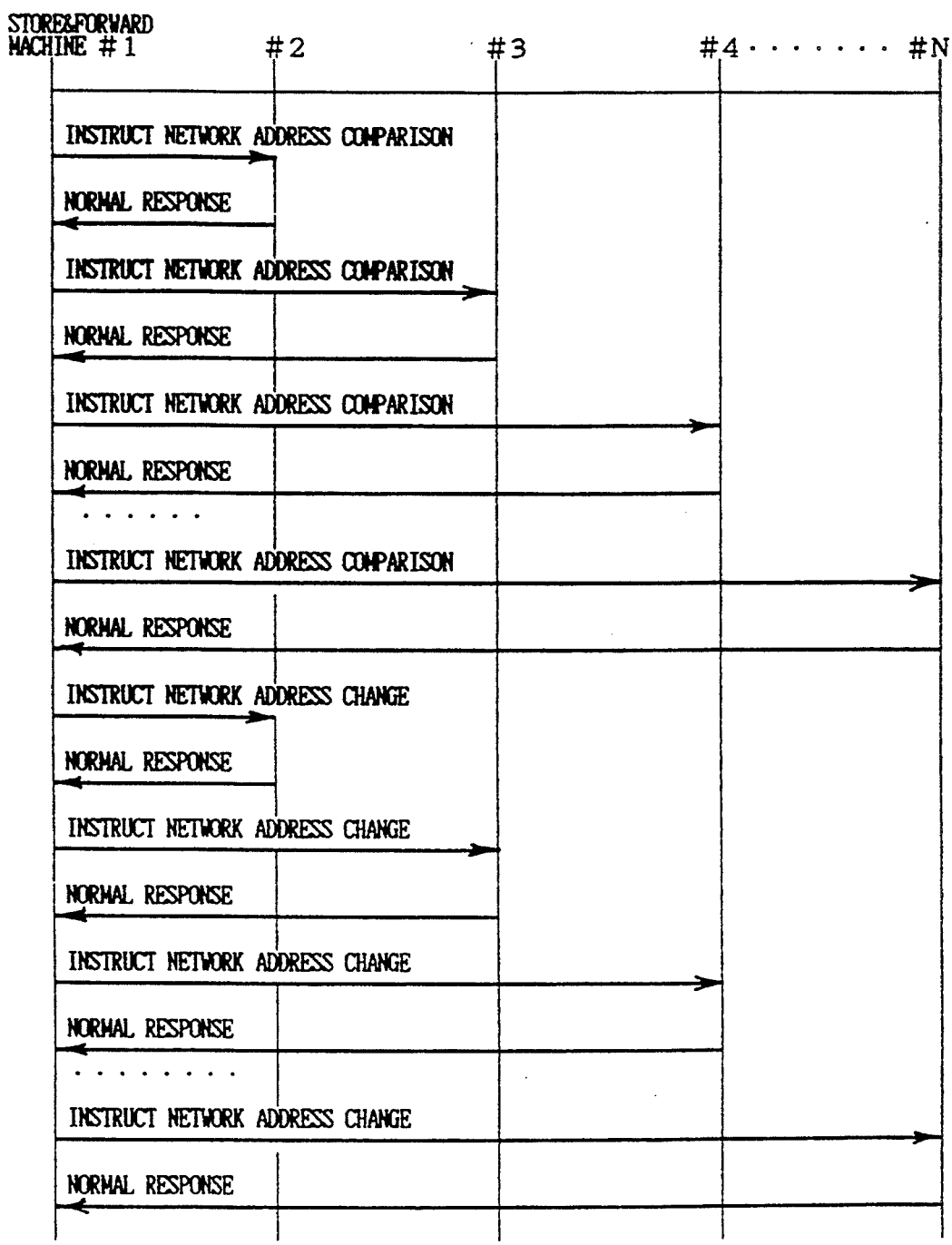
FIG. 23 is a view showing relationship between instructions of network address comparison and their responses and instructions of network address changes and their responses in accordance with flow charts of FIGS. 21 and 22.

FIG. 23 shows the relationship between instructions and their responses in accordance with the operation of FIGS. 11 and 12. In this case, the No. 1 store and forward machine is the control side node. After finishing the comparison in its own administrating table, the No. 1 node confirms whether or not the same address numbers are to be registered in each of other nodes; i.e. No. 2 node though No. N node. Then, after finishing all the comparisons, the No.1 node carries out the change operations of its own and other nodes.

Accordingly, in accordance with this embodiment, each node is effected not to change its data memorized in its own memory means unless it has confirmed that the same telephone number as a telephone number requested to register does not exist in its own memory means.

With this arrangement, in each correcting operation, it is checked if there is any double registration. Thus, an occurrence of the double registration is surely prevented.

Figure 24:
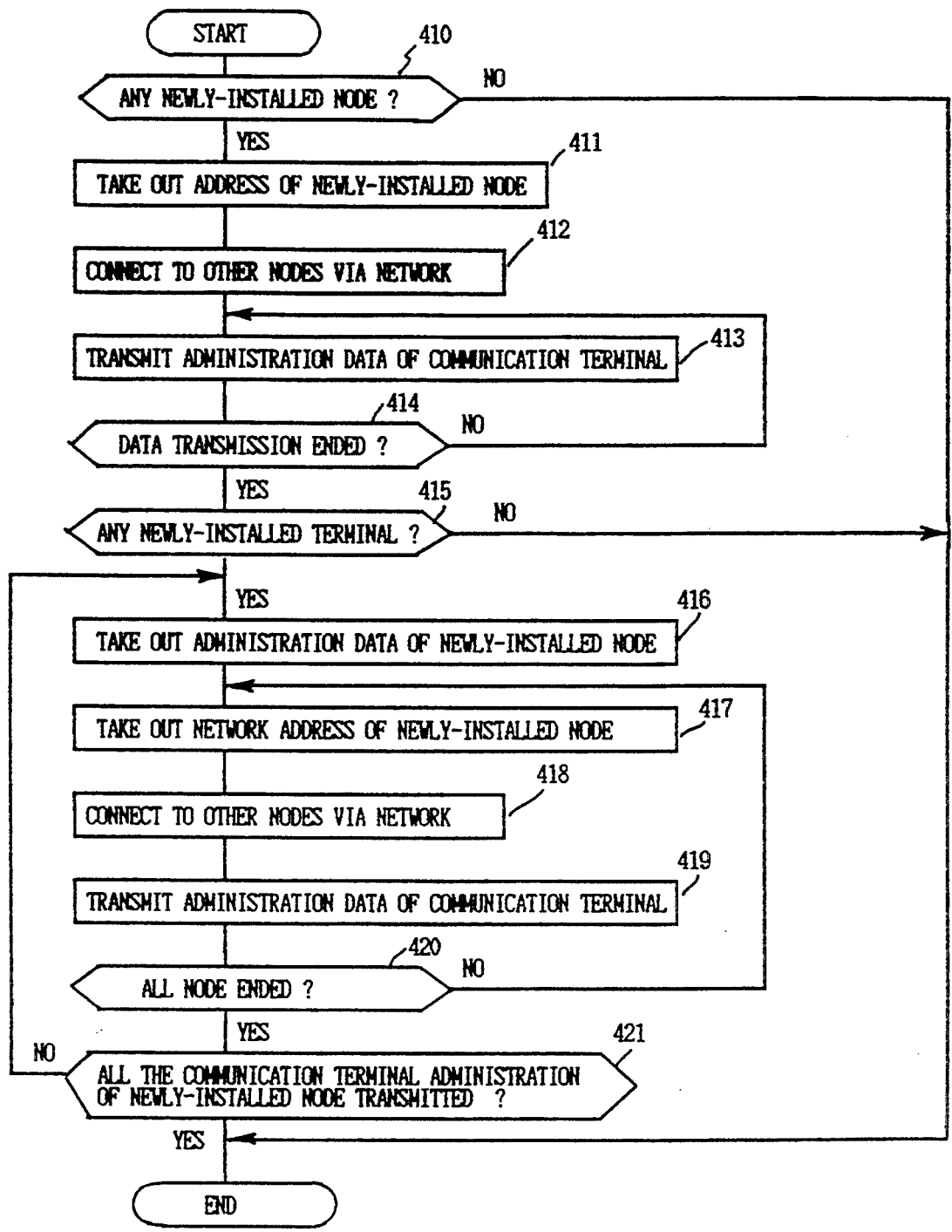
FIG. 24 is a flow chart illustrating a changing operation of a communication terminal administration table carried out in the case where an additional node is newly added; and, FIG. 25 is a schematic diagram showing a network system in which the additional node is newly added.
Figure 25:
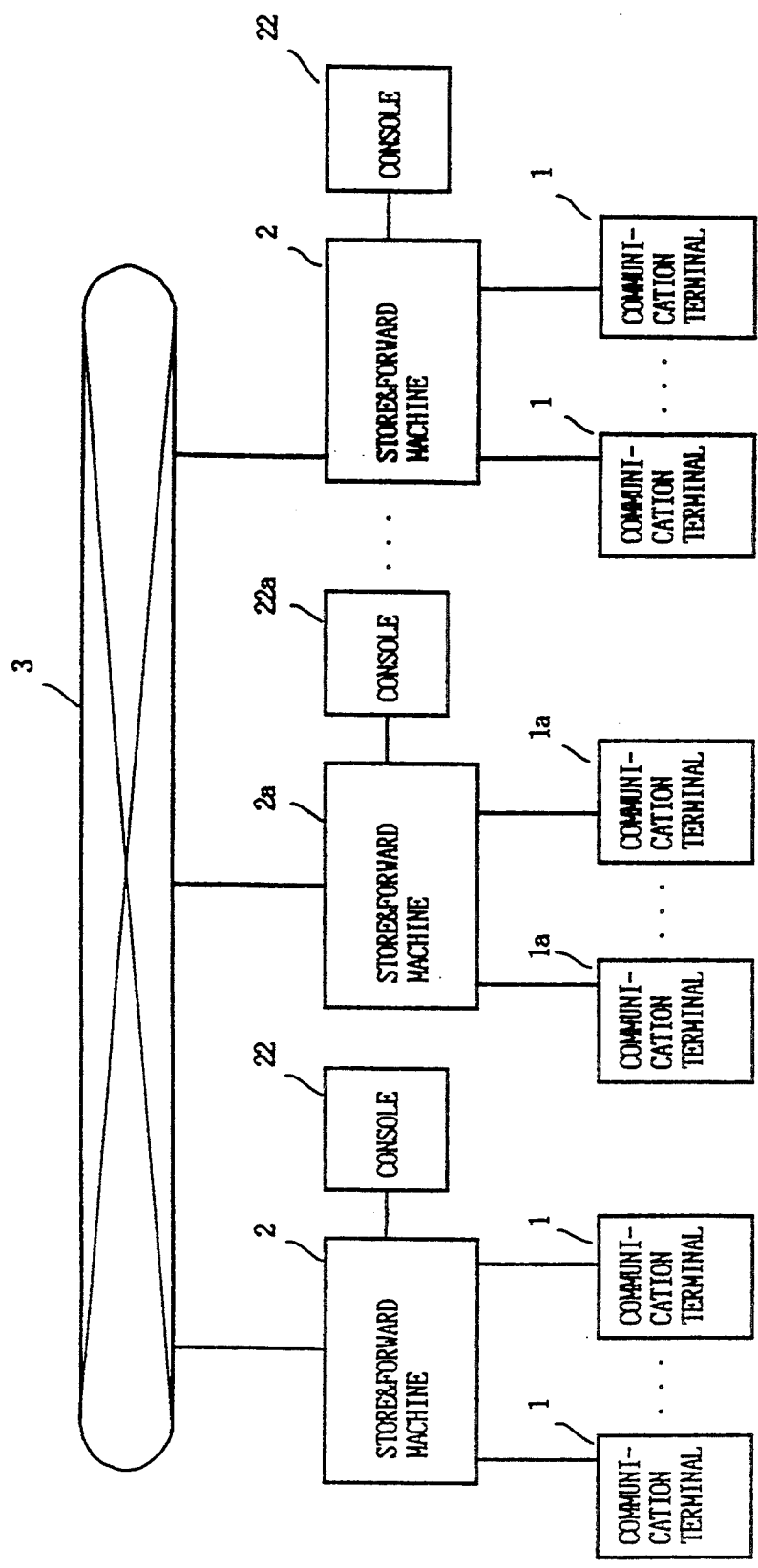

Next, referring now to FIGS. 24 and 25, the case wherein an additional store and forward machine 2a connected with communication terminals la is newly installed in the network system is explained.

FIG. 24 shows an action flow of a changing operation in the case where the additional store and forward machine 2a is newly installed in the network system. And, FIG. 25 shows a condition of the network system wherein the store and forward machine 2a, communication terminals la, and a console 22a are added in the network system.

In the flow chart of FIG. 24, in a step 410, it is checked whether or not there is any additional node (i.e. an additional store and forward machine 2a) installed. If the judgement in the step 410 is NO, the program ends its action flow. To the contrary, if the judgement in the step 410 is YES, an address of the node to be newly installed is taken out in a step 411. And, in turn, this newly-installed node 2a is connected through the network 3 to any other node (i.e. store and forward machine 2) in a step 412.

Subsequently, all the data of the administration table having been memorized in store and forward machine 2 are transmitted to the newly-installed node 2a, in a step 413. In this instance, the administration data belonging to the newly-installed node 2a are not transmitted yet. Then, in a step 414, it is checked whether or not the data transmission to all other nodes is ended. If the judgement in the step 414 is NO, the program returns to the step 413 to repeat the same procedure. If the answer in the step 414 is YES, it is further checked whether or not the newly-installed node 2a has any newly-installed communication terminals la in a step 415. If the judgement in the step 415 is NO, the program ends its action flow.

On the other hand, if the judgement in the step 415 is YES, the program proceeds to a step 416 to take out one administration data regarding this newly-installed node 2a. And next, in a step 417, a network address of a node to which the administration data are transmitted is taken out. And, in turn, this newly-installed node 2a is connected through the network 3 to any other node (i.e. store and forward machine 2) in a step 418.

Subsequently, all the data of the administration table of the newly-installed node 2a are transmitted to the other nodes 2 in a step 419. Then, in a step 420, it is checked whether or not the data transmission to all other nodes is ended. If the judgement in the step 420 is NO, the program returns to the step 417 to repeat the same procedure. If the answer in the step 420 is YES, it is further checked in a step 421 whether or not all the administration data of the newly-installed node 2a have been transmitted to other nodes. If the judgement in the step 421 is NO, the program returns to the step 416. And, the judgement in the step 421 is YES, the program ends its action flow.

Accordingly, in the case where an additional node or a communication terminal is newly installed, any one of nodes transmits all the content having been memorized in the memory means to the newly installed node, and to the contrary, said newly installed node transmits all the information relating to its own administrating communication terminals to other nodes.

With this arrangement, the newly installed node and other nodes can easily share their information, thereby facilitating an additional installation of node or communication terminal.

As this invention may be embodied in several forms without departing from the spirit of essential characteristics thereof, the present embodiment is therefore illustrative and not restrictive, since the scope of the invention is defined by the appending claims .rather than by the description preceding them, and all changes that fall within meets and bounds of the claims, or equivalence of such meets and bounds are therefore intended to embraced by the claims.

What is claimed is:

1. A network system comprising:
   a plurality of nodes, each node including a respective administrating means for administrating at least one communication terminal located in a predetermined region in the network system, wherein said administrating means operates for flexibly changing grouping of communication terminals to be associated with each node in response to establishment, abolishment and replacement of communication terminals;
   each administrating means including a respective communication terminal administration table, each communication terminal administration table including a content common with the communication terminal administration table of the administrating means of each of said plurality of nodes, said respective communication terminal administration table memorizing network addresses of all communication terminals existing in the network system administrated by said administrating means of said plurality of nodes; and
   said administrating means of each node notifying changes of communication addresses relating to establishment, abolishment and replacement of communication terminals administrated thereby to the administrating means of all remaining nodes in the network system, for renewing the respective communication terminal administration table of each of said plurality of nodes in the same manner so as to maintain correspondence of communication terminal administration tables among all the nodes.

2. A network system in accordance with claim 1, wherein said communication terminal administration table memorizes telephone numbers as said network addresses.

3. A network system in accordance with claim 1, wherein said communication terminal administration table includes a node address for memorizing, as a unit, network addresses of communication terminals administrated by an administration table of a node corresponding to said node address.

4. A network system in accordance with claim 1, wherein said changes of communication addresses include adding and deleting telephone numbers to and from each said communication terminal administration table in response to establishment, abolishment and replacement of communication terminals.

5. A network system comprising:
a plurality of nodes, each node including a respective administrating means for administrating at least one communication terminal located in a predetermined region in the network system, wherein said administrating means operates for flexibly changing grouping of communication terminals to be associated with each node in response to establishment, abolishment and replacement of communication terminals;
each administrating means including a respective communication terminal administration table, each communication terminal administration table including a content common with the communication terminal administration table of the administrating means of each of said plurality of nodes, said respective communication terminal administration table memorizing higher priority information including telephone numbers used for communication in the network system and lower priority information other than telephone numbers of all the communication terminals existing in the network system administrated by said administrating means of said plurality of nodes; and
said administrating means of each node responding to change relating to establishment, abolishment and replacement of communication terminals by renewing the higher priority information in the respective communication terminal administration table thereof prior to changing the lower priority information therein.

6. A network system in accordance with claim 5, wherein said administrating means of each node changes the content of the respective communication terminal administration table thereof when any change occurs in a communication terminal administrated by said each node and when any change is instructed from administrating means of remaining nodes connected in the system.

7. A network system in accordance with claim 5, wherein, when said lower priority information is abnormally changed, a notification of abnormality is provided to administrating means of all the nodes in the network system, and said administrating means cancel changes of higher priority information in response to the abnormal change of said lower priority information and return the higher priority information to previously memorized data.

8. A network system comprising:
a plurality of nodes, each node including a respective administrating means for administrating at least one communication terminal located in a predetermined region in the network system, wherein said administrating means operates for flexibly changing grouping of communication terminals to be associated with each node in response to establishment, abolishment and replacement of communication terminals;
each administrating means including a respective communication terminal administration table, each communication terminal administration table including a content common with the communication terminal administration table of the administrating means of each of said plurality of nodes, said respective communication terminal administration table memorizing names and telephone numbers of all communication terminals existing in the network system administrated by said administrating means of said plurality of nodes; and
said administrating means of each node notifying changes of said communication terminal administration table relating to establishment, abolishment and replacement of communication terminals administrated thereby to the administrating means of all remaining nodes in the network system and changing the telephone numbers prior to changing the names of communication terminals.

9. A network system comprising:
a plurality of nodes, each node including a respective administrating means for administrating at least one communication terminal located in a predetermined region in the network system, wherein said administrating means operates for flexibly changing grouping of communication terminals to be associated with each node in response to establishment, abolishment and replacement of communication terminals;
each administrating means including a respective communication terminal administration table, each communication terminal administration table including a content common with the communication terminal administration table of the administrating means of each of said plurality of nodes, said respective communication terminal administration table memorizing network addresses of all communication terminals existing in the network system administrated by said administrating means of said plurality of nodes; and
said administrating means of each node prohibiting a correction of a particular network address relating to a communication terminal designated as an unchangeable communication terminal even if a changing request is received from administrating means of remaining nodes in the network system.

10. A network system in accordance with claim 9 wherein, if an administrating means of one of the remaining nodes has mistakenly changed the respective communication terminal administration table thereof in response to a changing request for said particular network address designated as unchangeable, a changed content of said communication terminal administration table is cancelled and returned to previous memorized data.

11. A network system comprising:

a plurality of nodes, each node including a respective administrating means for administrating at least one communication terminal located in a predetermined region in the network system, wherein said administrating means operates for flexibly changing grouping of communication terminals to be associated with each node in response to establishment, abolishment and replacement of communication terminals;

each administrating means including a respective communication terminal administration table, each communication terminal administration table including a content common with the communication terminal administration table of the administrating means of each of said plurality of nodes, said respective communication terminal administration table memorizing telephone numbers of all the communication terminals existing in the network system administrated by said administrating means of said plurality of nodes; and said administrating means of each node renewing contents of the respective communication terminal administration table thereof after confirming that a telephone number identical with a telephone number requested to register does not exist in said respective communication terminal administration table thereof, and further notifying existence of double registration to an operator when a telephone number identical with the telephone number requested to register exists in said respective communication terminal administration table thereof.

12. A network system comprising at least two nodes each administrating a plurality of communication terminals, and each of said nodes having a memory means for memorizing not only data of its own administrating communication terminals but data of other communication terminals administrated by other nodes, and any one of nodes transmitting all the content of the memory means to a newly installed node, and to the contrary, said newly installed node transmitting all the information relating to its own administrating communication terminals to other nodes.

13. A network system in accordance with claim 12, in which said one data transmission from said any one of nodes for transmitting all the content of the memory means to a newly installed node is carried out prior to said the other data transmission from said newly installed node for transmitting all the information relating to its own administrating communication terminals to said other nodes.

14. A network system comprising:

a plurality of nodes, each node including a respective administrating means for administrating at least one communication terminal located in a predetermined region in the network system, wherein said administrating means operates for flexibly changing grouping of communication terminals to be associated with each node in response to establishment, abolishment and replacement of communication terminals;

each administrating means including a respective communication terminal administration table, each communication terminal administration table including a content common with the communication terminal administration table of the administrating means of each of said plurality of nodes, said respective communication terminal administration table memorizing data of all the communication terminals existing in the network system administrated by said administrating means of said plurality of nodes; and said administrating means of each node changing the content of the respective communication terminal administration table thereof when a data change occurs in response to establishment, abolishment and replacement of communication terminals administrated thereby and notifying said data change to the respective administrating means of remaining nodes connected in said network system, said administrating means of each node further changing the content of the respective communication terminal administration table thereof when a changing request is received from an administrating means of any of the remaining nodes in the network system, thereby renewing the communication terminal administration table of the respective administrating means of each node in the same manner so as to maintain correspondence of the contents of communication terminal administration tables among all the nodes.

15. A network system comprising:

a plurality of store and forward apparatuses each administrating at least one of a plurality of communication terminals located in a predetermined region in the network system, wherein each said store and forward apparatus operates for flexibly changing grouping of communication terminals to be associated with each store and forward apparatus in response to establishment, abolishment and replacement of communication terminals;

each store and forward apparatus including a respective communication terminal administration table, each communication terminal administration table including a content common with the communication terminal administration tables of each other of said plurality of store and forward apparatuses; and said each store and forward apparatus renewing the content of the respective communication terminal administration table thereof when a data change occurs in response to establishment, abolishment and replacement of communication terminals administrated thereby, said each store and forward apparatus further renewing the content of the respective communication terminal administration table thereof when a changing request is received from any other store and forward apparatus in the network system with respect to change of content of the respective communication terminal administration table of said other store and forward apparatus, thereby renewing the communication terminal administration table of each store and forward apparatus in the same manner so as to maintain correspondence of the contents of communication terminal administration tables among all the store and forward apparatuses.

16. A network system in accordance with claim 1, wherein each administrating means respectively includes a memory means respectively comprising the communication terminal administration table thereof.

17. A network system in accordance with claim 15, wherein each individual store and forward apparatus respectively includes a respective memory means comprising the respective communication terminal administration table thereof, said individual store and forward apparatus further comprising renewing means for renewing contents of said respective memory means thereof forming the respective communication terminal administration table thereof responsive to establishment, abolishment and replacement of communication terminals administrated by said individual store and forward apparatus, said individual store and forward apparatus further comprising additional renewing means for further renewing the contents of said respective memory means thereof forming the respective communication terminal administration table thereof responsive to receiving a changing request from another store and forward apparatus in the network system with respect to a change of content of the memory means forming the communication terminal administration table of said another store and forward apparatus, thereby commonly renewing the respective memory means forming the communication terminal administration table of each store and forward apparatus so as to maintain correspondence of the contents thereof for all the store and forward apparatuses.

* * * * *